(12) United States Patent
Vogel et al.

(10) Patent No.: US 6,970,940 B1
(45) Date of Patent: Nov. 29, 2005

(54) SYSTEM AND METHOD FOR DISTRIBUTING A SINGLE MULTICAST MULTI-PROGRAM AUDIO STREAM OVER A NETWORK

(75) Inventors: Mark O. Vogel, Hampshire, IL (US); Stephen L. Maynard, Lake Zurich, IL (US); Ali Akgun, Chicago, IL (US)

(73) Assignee: 3Com Corporation, Marlborough, MA (US)

( * ) Notice: Subject to any disclaimer, the term of this patent is extended or adjusted under 35 U.S.C. 154(b) by 948 days.

(21) Appl. No.: 09/809,822

(22) Filed: Mar. 16, 2001

(51) Int. Cl.[7] ............................. G06F 15/16; H04J 3/20
(52) U.S. Cl. .................. 709/236; 709/230; 370/395.52
(58) Field of Search ............................... 709/230, 236; 370/310.1, 312, 395.5, 395.52–3; 710/11; 379/90.02, 93.31

(56) References Cited

U.S. PATENT DOCUMENTS

| | | | |
|---|---|---|---|
| 4,237,486 A | * | 12/1980 | Shimp ........................ 348/475 |
| 4,788,675 A | | 11/1988 | Jones et al. ................. 370/69.1 |
| 4,845,751 A | | 7/1989 | Schwab ....................... 381/25 |
| 4,920,432 A | | 4/1990 | Eggers et al. .............. 360/33.1 |
| 4,991,207 A | | 2/1991 | Shiraishi et al. ............... 380/9 |
| 5,131,048 A | | 7/1992 | Farenelli et al. ............... 381/81 |
| 5,636,276 A | | 6/1997 | Brugger ......................... 380/4 |
| 5,909,431 A | * | 6/1999 | Kuthyar et al. ............. 370/260 |
| 5,953,350 A | * | 9/1999 | Higgins ....................... 370/524 |
| 6,134,587 A | * | 10/2000 | Okanoue .................... 709/222 |
| 6,522,342 B1 | * | 2/2003 | Gagnon et al. ............. 345/716 |

OTHER PUBLICATIONS

SMILE—A Multimedia Communication Framework for Distributed Collaboration, Johanson, M., Framkom Research Corporation, pp. 1-12.*
RFC 1112: Host Extensions for IP Multicasting, Deering, S., Aug. 1989□□.*
Computer Networking: A Top Down Approach featuring the Internet, Kurose & Ross, 2000.*
Cisco 1400 Series, Overview, Cisco Systems, 1999, p. 1-10.*
Multicast Deployment Made Easy, IP Multicast Planning & Deployment Guide, Cisco Systems, 1999, p. 1-20.*
ViaCast IP multicastig: The answer to broadband content deliver, Medina, D., Broadcast Engineering, Sep. 2000.*

* cited by examiner

*Primary Examiner*—B. Prieto
(74) *Attorney, Agent, or Firm*—McDonnell Boehnen Hulbert & Berghoff LLP

(57) ABSTRACT

A system and method for distributing multi-program audio over a network includes the use of a Local Area Network, Wide Area Network, an Intranet and the Internet. The system includes a network audio source, a network distribution system and end devices. The method, for distributing multi-program audio over a network includes creating a network audio frame from a plurality of blocks of data from at least one audio program, placing each network audio frame within a transport structure for transport across the network and assigning an address to the transport structure prior to delivering the transport structure to a physical media.

11 Claims, 5 Drawing Sheets

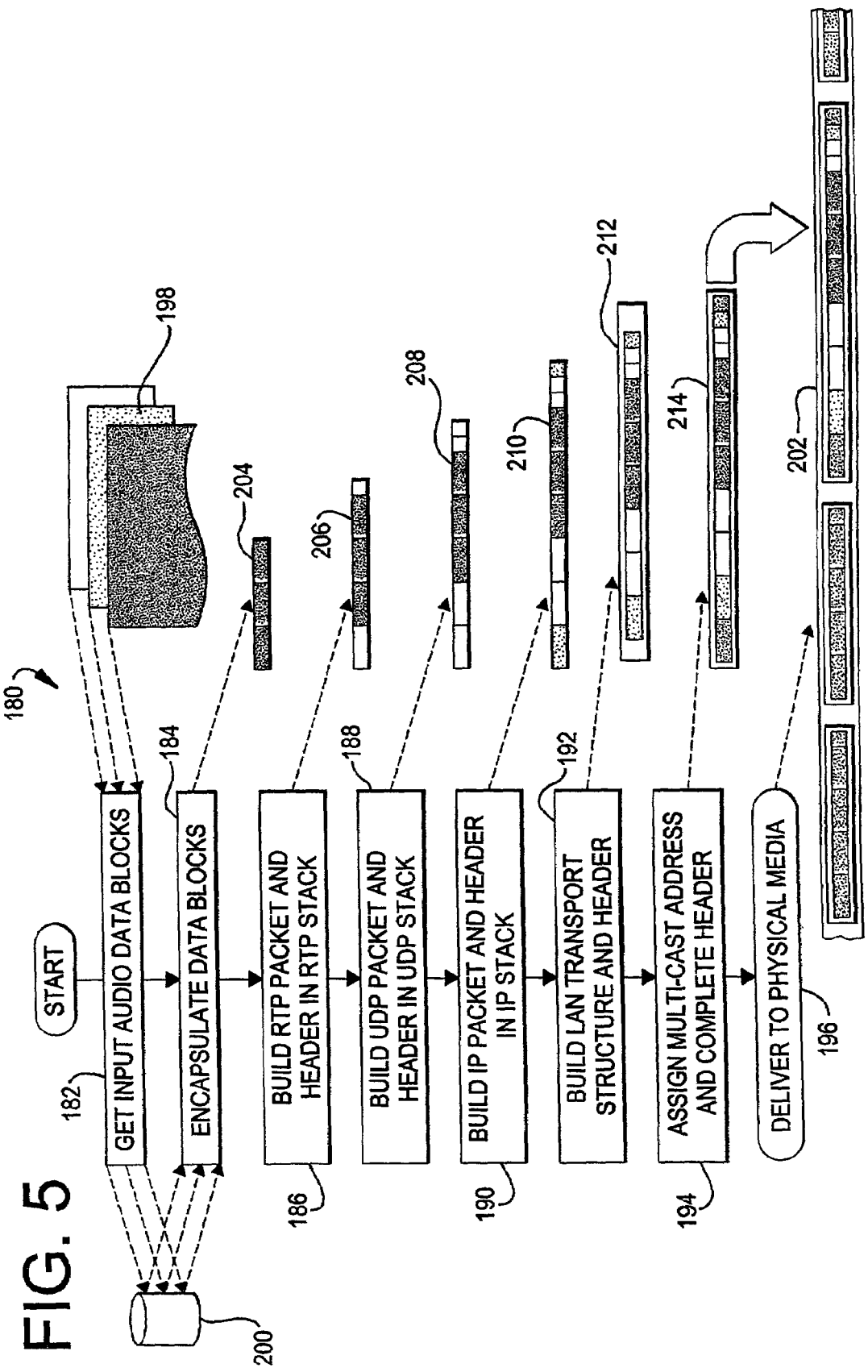

SYSTEM AND METHOD FOR DISTRIBUTING A SINGLE MULTICAST MULTI-PROGRAM AUDIO STREAM OVER A NETWORK

FIELD OF THE INVENTION

This present invention relates to audio distribution systems. More specifically, it relates to a system and method for distributing multi-program audio over a network.

BACKGROUND OF THE INVENTION

People are increasingly utilizing Local Area Networks (LANs) in their residences to connect devices residing in disparate rooms within their residences. In addition, companies are also looking at utilizing LANs within vehicles to enable passengers to access information or entertainment while in a vehicle. The presence of LANs in a residential arena provides the opportunity to utilize this distribution network for non-traditional LAN applications. One such application is LAN audio. With the widespread presence of digital audio material, for example Moving Pictures Experts Group Layer-3 (MP3), LANs become an excellent transport network for the distribution of audio material throughout the home.

Current residential audio distribution systems typically take one of two following forms, excluding placing standard audio wiring throughout the home. The first system uses wireless technology to provide a tetherless connection between an audio source and a headset, or a speaker system. This type of system does not support multiple simultaneous audio programs on the system, and is generally not designed as a network distribution system but instead is intended to eliminate the need for wires or wiring. In addition, the wireless interface is typically integrated with the end-user device. The second system uses the Transmission Control Protocol/Internet Protocol (TCP/IP) protocol suite to distribute audio over a LAN. This is typically implemented with an audio server as a source device, and a personal computer with an audio card as the end device. Internet Protocol (IP) multicast is used along with Realtime Transport Protocol (RTP) to enable end devices to join a multicast service. RTP is an Internet Engineering Task Fork (IETF) standard for streaming realtime multimedia over IP in packets. It supports transport of realtime data like interactive voice and video over packet switched networks. Within the RTP protocol, currently only a single audio program and audio encoding type is supported per multicast stream. Therefore to support multi-program audio, multiple multicast streams must be created with each stream supporting a separate audio program and potentially audio encoding type. The user would, at the end device, select the desired multicast stream from the group of multicast audio programs. This also means that the end device must learn or acquire the addresses of all of the multicast streams.

Therefore, it is desirable to provide a method and system which distributes multi-program audio over a network such as, for example, LAN within a single multicast stream, and which supports multiple audio encoding types.

SUMMARY OF THE INVENTION

The system and method of the present invention provides for the distribution of multi-program audio over a network. The network may include a Local Area Network (LAN), Wide Area Network, an Intranet and a public network such as the Internet.

In accordance with one aspect of the present invention, a system for distributing multi-program audio over a network includes a network audio source, a network distribution system, and at least one end device. In a particular embodiment, the network distribution system is a wired system such as, but not limited to, IEEE 802.3, IEEE 802.5, IEEE 1394, and Home Phone Network Alliance (HPNA). In another particular embodiment, the network distribution system includes, a wireless system and includes, but is not limited to, IEEE 802.11, Bluetooth, HomeRF and IrDA. The end device provides a standard interface to a sound-producing device such as speakers or headphones.

In accordance with another aspect of the present invention, a method for distributing multi-program audio over a network includes receiving audio data blocks, encapsulating the audio data blocks into frames, building a network model layer, such as an Open Systems Interconnection (OSI) model layer protocol packet and stack, building a network transport structure and header, assigning a multi-cast address and then delivering the packet to the physical media. In one particular embodiment of the method of the present invention, the network transport structure is placed within an OSI layer 2 frame such as a Medium Access Control frame. In another particular embodiment, an Internet Protocol/User Datagram Protocol/Realtime Transport Protocol of the OSI layers is used to transport the audio data across the network.

The foregoing and other features and advantages of the system and method for distributing multi-program audio over a network will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present invention are described with reference to the following drawings, wherein:

FIG. 5 is a flow chart diagram illustrating a method using the IP/UDP/RTP protocol implementation in accordance with another preferred embodiment of the present invention.

DETAILED DESCRIPTION OF PREFERRED EMBODIMENTS

The present invention is directed to a system and method for distributing multi-program audio over a network. The network preferably is a Local Area Network (LAN) but may include, and is not limited to, a Wide Area Network (WAN) or an Intranet or the Internet.

In a preferred embodiment, the system of the present invention includes a software application or a device that packages the audio material and places it on the network. It additionally consists of a remote device which accesses the network, retrieves the specific audio program, and converts the audio material back to an analog format that can be used by standard audio devices such as headphones and speakers. The system in accordance with a preferred embodiment also provides the physical interface for these standard audio devices. With such a system a user can access audio from any location where the network is present, utilizing either a physical, or a wireless connection. In addition, a user can program a preferred selection for the material to be made available on the network, and can select which material is to be decoded at the receiving end device. Such a preferred embodiment of the system in accordance with the present invention can be used within a residence or a vehicle with the end device being transportable between the two. It may also be used in commercial applications where multi-program audio is utilized such as, for example, airplanes, and office complexes.

System Overview

Figure 1:
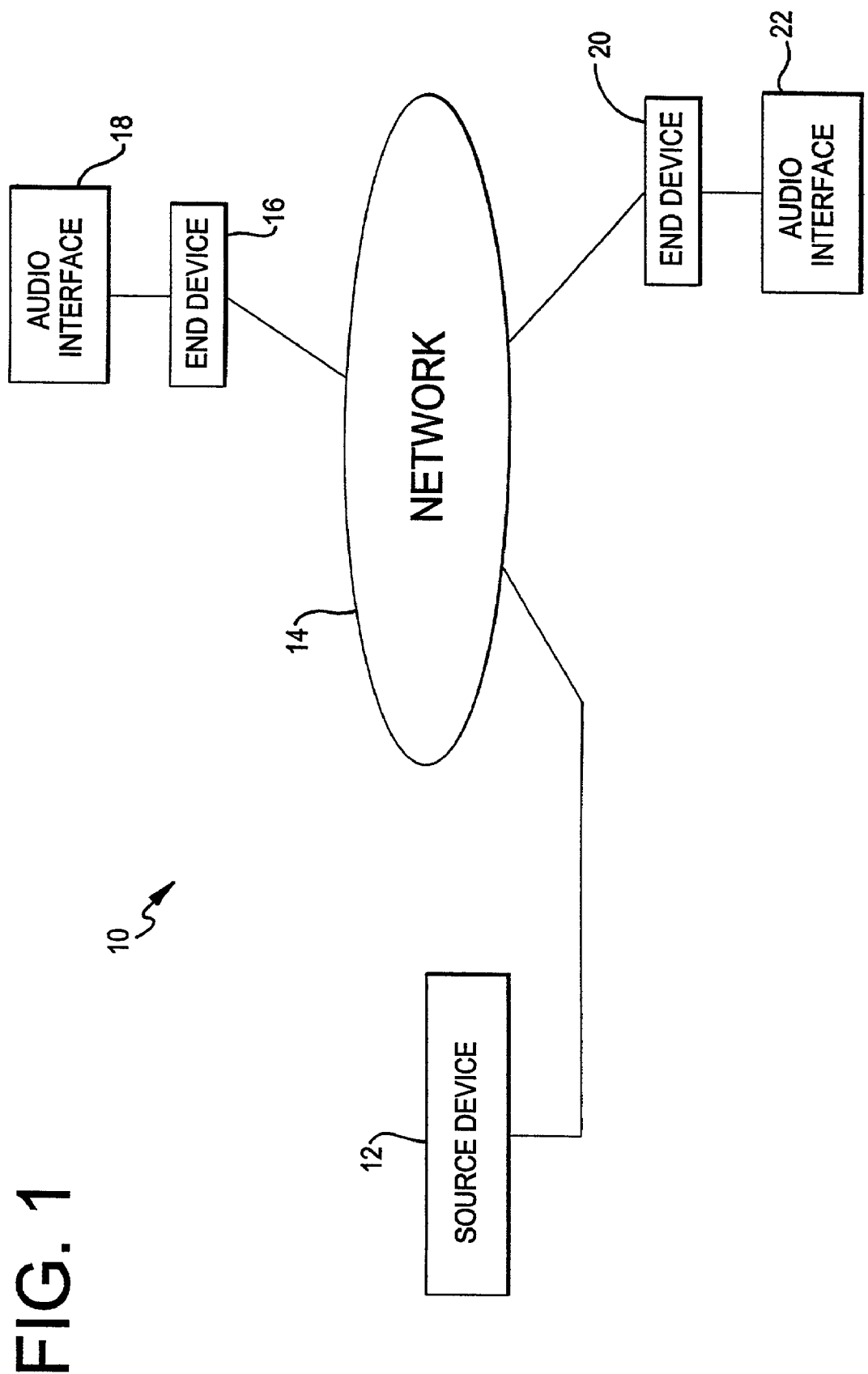
FIG. 1 is a diagram illustrating a preferred embodiment of the system for distributing multi-program audio over a network in accordance with the present invention.

FIG. 1 is a diagram illustrating a network audio system 10, in which the network 14 is a Local Area Network (LAN) in accordance with a preferred embodiment of the present invention. The LAN audio system 10 is comprised of an audio source device 12 and one or more receiving end devices 16, 20. In one embodiment of the present invention, the LAN is a 100 Mega-bit ("Mbit") per second or faster Ethernet, LAN. However, other types of LANs could also be used, for example, optical or coaxial cable networks. The source may be a device such as a phonograph or an audio device such as a "jukebox" including multi-media such as Compact Discs (CDs) and Digital Video Discs (DVDs) that is able to stream multiple audio programs. In the alternative, the source 12 may be an application or sequence of instructions that resides on a server, a gateway, or a standard personal computer. In either case, the audio source 12 is connected to the network 14 or in a preferred embodiment, the LAN. Through the source device 12 or application, the user is able to configure the system to stream a number of audio programs on to the network 14. At the user end, there is a device which has a network interface, and a standard audio interface 18, 22 such as, for example, RCA interfaces, or speaker terminals, to connect to sound producing devices such as headphones, or speakers. In addition, the system 10 in accordance with the present invention has the hardware and software necessary to select the audio program and convert it to a standard baseband analog format. This enables the user to select different audio programs as well as listen to them using different audio devices. In a particular embodiment, the end device 16, 20 may be separate from or alternatively integrated with the receiving device. In another particular embodiment, the end device 16, 20 may be mounted in a structure such as, for example, a panel in an armrest in a vehicle or airplane to which a receiving device may be connected. The network itself, although shown as being interfaced with physical cabling in FIG. 1, may also be a wireless network. The network distribution system, in particular wired embodiments may include, but is not limited to, IEEE 802.3, IEEE 802.5, IEEE 1394 (Firewire), and Home Phone Network Alliance (HPNA). The network distribution system in particular wireless embodiments may include, but is not limited to, IEEE 802.11, Bluetooth, HomeRF and IrDA.

A preferred embodiment of the present invention uses the IEEE 802.11 high speed wireless protocol at the physical level. The IEEE 802.11 Wireless LAN specification was developed to provide wireless connectivity to automate machinery, equipment, or stations that require rapid deployment, or stations that require rapid deployment, which may be portable or handheld, or which may be moving within a local area. The 802.11 devices operate in the 2.4 GHz Industrial, Scientific, and Medical (ISM) band at rates of up to 2 Mbps and distances up to 100 meters. Both frequency-hopping and direct sequence spread spectrum are supported by the specification. Frequency-hopping spread spectrum is implemented using Gaussian Frequency Shift Keying (GFSK) with 1 or 2 bits per symbol, and 1 MHz channels. The hop size is 6 MHz, and in the United States up to 79 channels are available in the ISM band. Direct sequence spread spectrum is implemented using Differential Binary Phase Shift Keying (DBPSK) with 1 or 2 bits per symbol and 25 MHz channels. Further, three to six direct sequence channels are available in the ISM band depending on whether there is channel overlap.

The 802.11 system provides a point-to-point connection (two stations communicating directly), or a point-to-multipoint connection. In such a multipoint arrangement, a channel is shared among multiple 802.11 devices. With a station in each system acting as an access point, multiple systems may be connected to form a distribution system. If a device in a system acts as a portal, a system and/or a distribution system may be connected to a non-802.11 system such as an 802.3 wire line Ethernet LAN via the portal device. For more information on the IEEE 802.11 Wireless LAN specification see the Institute of Electrical and Electronic Engineers (IEEE) standard for Wireless LANs incorporated herein by reference. IEEE standards can be found on the World Wide Web at the Universal Resource Locator (URL) www.iee.org.

Another preferred embodiment of the system to distribute multi-program audio over a network uses Bluetooth technology. Bluetooth is a short-range radio link intended to replace the cable(s) connecting portable and/or fixed electronic devices. Bluetooth technology features low power, robustness, low complexity and low cost. It operates in the 2.4 GHz Industrial, Scientific and Medical (ISM) band. Devices equipped with Bluetooth are capable of exchanging data at speeds up to 720 kbps at ranges up to 10 meters. It should be noted that higher power devices than typical Bluetooth enabled devices, such as, for example, a Network Access Point, may communicate via Bluetooth with an RF enabled device over a greater range, such as, for example, approximately 100 meters.

A frequency hop transceiver is used to combat interference and fading. A shaped, binary FM modulation is applied to minimize transceiver complexity. A slotted channel is applied with a nominal slot length of 625 μs. For full duplex transmission, a Time-Division Duplex (TDD) scheme is used. On the channel, information is exchanged through packets. Each packet is transmitted on a different hop frequency. A packet nominally covers a single slot, but can be extended to cover up to five slots.

The Bluetooth protocol uses a combination of circuit and packet switching. Slots can be reserved for synchronous packets. Bluetooth can support an asynchronous data channel, up to three simultaneous synchronous (voice) channels, or a channel which simultaneously supports asynchronous data and synchronous voice. Each voice channel supports a 64 kb/s synchronous (voice) channel in each direction. The asynchronous channel can support maximal 723.2 kb/s asymmetric, or 433.9 kb/s symmetric.

The Bluetooth system consists of a radio unit, a link control unit, and a support unit for link management and host terminal interface functions. The link controller carries out the baseband protocols and other low-level link routines.

The Bluetooth system provides a point-to-point connection (only two Bluetooth units involved), or a point-to-multipoint connection. In the point-to-multipoint connection, the channel is shared among several Bluetooth units. Two or more units sharing the same channel form a piconet. One Bluetooth unit acts as the master of the piconet, whereas the other units act as slaves. Up to seven slaves can be active in a piconet.

System Operation

As is known in the art, networks have their own hardware and software to interface with the physical media that carry the signals, and the network software must interface with the operating system software. The processing units communicate with each other using a set of rules called a protocol. A group of protocols, all related to the same model are called a protocol suite. To encourage open systems, a common model called Open Systems Interconnection (OSI) was developed by the International Standards Organization. OSI engendered a protocol suite which allows computers of all sizes and capabilities the world over to communicate using a common set of rules.

The OSI model consists of seven layers of software including from lowest to highest, a physical, data-link, network, transport, session, presentation and application layer. Each of the layers makes different functionality available to computers communicating using this model. Each layer in the model deals with specific computer communication functions. A preferred embodiment of the system 10 of the present invention uses one or more layers of the protocol stack defined by the OSI model. The physical layer is the lowest layer and specifies the rules for transmission of signals across the physical media (i.e., the electrical, mechanical and functional control of data circuits). The physical media is analogous to interface ports. The physical layer transmits bits over a communication link.

The data link layer or media abstraction, deals with transmission of data between devices on the same network. In addition to describing how a device accesses the physical media, this layer also provides some measure of error detection and control. This layer is thus concerned with procedures and protocols for operating the communications lines. Local Area Network (LAN) technologies such as, Ethernet, Token Ring and Fiber Distributed Data Interface (FDDI) operate at this layer. Data link addresses are implemented at this layer, and provide each device connected to the network a unique identifier by which packets may be sent to it. The data link layer includes the Medium Access Control (MAC) layer. As is known in the art, the MAC layer controls access to a transmission medium via the physical layer.

The network layer deals with transfer of data between devices on different networks. The network layer adds the notion of network addresses which are specific identifiers for each intermediate network between a data source and a destination. For example, in the network layer there is an Internet Protocol (IP) layer. This IP layer roughly corresponds to the OSI layer 3, the network layer, but is typically not defined as part of the OSI model. As is known in the art, the IP layer is a routing protocol designed to route traffic within a network or between networks. More information on IP may be obtained from the Internet Engineering Task Force (IETF) Request for Comments (RFC), RFC-791 incorporated herein by reference.

The remaining layers, the transport layer, the session layer, the presentation layer and application layer are called the higher layers. These layers deal with communication between message source and message destination. The transport layer defines the rules for information exchange and manages end-to-end delivery of information within and between networks, including error recovery and flow control. For example, a User Datagram Protocol layer (UDP) may be present in the transport layer. The UDP layer roughly corresponds to OSI layer 4, the transport layers, but is typically not defined as part of the OSI model. As is known in the art, UDP provides a connectionless mode of communications with datagrams. More information on UDP may be obtained from RFC-768 incorporated herein by reference.

The session layer is concerned with dialog management. The presentation layer provides transparent communications services by masking the difference of varying data formats between dissimilar systems. The application layer contains functions for particular applications services, such as, file transfer, remote file access and virtual terminals.

Within the OSI model, the user presents data through application programs, such as, the User Interface Application Programming Interface, to the highest layer the application layer. This data is then passed downward through the hierarchy of layers with each layer adding addressing and/or control information. The OSI layer Application Programming Interfaces (APIs) pass data between the OSI model layers. When the data reaches the physical layer, and to the physical interfaces, it is sent to a device or network system. Conversely, received data at the physical interfaces is passed up through the layers with each layer stripping address or control information.

The system and method for distributing multi-program audio over a network may use other communication protocols beside the OSI model. These include, but are not limited to, Transmission Control Protocol/Internet Protocol (TCP/IP), User Datagram Protocol/Internet Protocol (UDP/IP), Hyper Text Transfer Protocol (HTTP), Trivial File Transfer Protocol (TFTP), File Transfer Protocol (FTP), and the Bootstrap Protocol (BootP). The TCP/IP protocol is a networking protocol that provides communications across interconnected networks, between computers with diverse hardware architectures and various operating systems. The UDP/IP is part of the TCP/IP protocol suite. UDP/IP provides for exchange of datagrams without acknowledgements or guaranteed delivery. HTTP is the actual protocol used by the Web server and the Client browser, for moving documents around the Internet. The TFTP is a simplified version of the File Transfer Protocol (FTP) that transfers files but does not provide password protection or user-directory capability. TFTP is associated with the TCP/IP family of protocols and depends on the connectionless datagram delivery service, UDP. More information on TFTP is available from RFC-1350 incorporated herein by reference. FTP lets users quickly transfer text and binary files to and from a distant or local personal computer, list directories, delete and rename files on the foreign host and perform wildcard transfers between hosts. The distant or local personal computer may be a local area network or a phone line across the world or connected to the Internet. The BootP is a TCP/IP protocol which allows an Internet node to discover certain startup information such as, its IP address.

Another suitable protocol that may be used to transport the audio data is the Realtime Transport Protocol (RTP), which itself is carried inside of UDP (User Datagram Protocol). RTP is described in H. Schulzrinne et al., "RTP:

A Transport Protocol for Real-Time Applications," IETF RFC 1889, January 1996, which is incorporated herein by reference.

The operating environment for the system 10 of the present invention includes a processing system with at least one Processing Unit such as a Central Processing Unit (CPU) and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

There are at least two preferred embodiments for the network audio protocol. A first preferred embodiment is based on a MAC layer implementation that eliminates the need for the higher layer IP/UDP/RTP protocols. This preferred embodiment reduces the overhead of each audio packet and enables a lower cost end device since processing and memory requirements of a MAC layer implementation are much lower than higher layer implementations.

The second preferred embodiment is based on an IP/UDP/RTP implementation with a modification to RTP to enable multi-program audio and multiple encoding types within a single multicast stream. This increases the complexity of the end device but enables the introduction of additional IP based capabilities such as a Real Time Control Protocol (RTCP) which is a part of RTP, eXtensible Markup Language (XML), HyperText Markup Language (HTML), and Service Location Protocol (SLP). In general, the capabilities of the two preferred embodiments rely on the introduction of a LAN audio frame which enables the multi-program audio and multiple encoding type capabilities within a single multicast stream.

The network, and in a preferred embodiment, the LAN audio source sequentially takes a block of data from a user defined number of audio programs, and encapsulates each block of audio data in a network, or in one embodiment, in a LAN audio frame. A preferred method of the present invention includes the source device then placing each LAN audio frame in a separate transport structure, assigning a common multicast address, and then streaming the data onto the network or preferably the LAN. Each transport structure frame contains audio information from a single program, each of which could be of a different audio encoding type, such as, for example, but not limited to, Moving Pictures Experts Group Layer-3 (MP3) and Wave File (WAV) which is a Microsoft Windows proprietary format for encoding sound. Consecutive transport frames may contain audio data from different programs, however, all frames are addressed by a single multicast address as described herein below. To enable this flexibility, each LAN audio frame includes a LAN audio header that is pre-pended to the audio data contained within the LAN audio frame. For one of the preferred embodiment which uses RTP, this is considered an extension to the RTP protocol. The LAN audio header provides the end devices with the information they need to extract a specific program from the single multicast stream. The header includes some combination of the following items, which are dependent on the preferred embodiments: version number of the network, or more particularly, in one embodiment, the LAN audio protocol, size of the payload, number of programs in the multicast stream, program number, encoding type (MP3, WAV, etc.) within the payload, packet sequence (per program), fragmentation (standard or proprietary), and program descriptor.

To enable multi-program audio within a single multicast stream, addressing of the network audio data is based on a single specific multicast address that conforms to the particular network or preferably, but not limited to, LAN implementation. For example, with an Institute of Electrical and Electronics Engineers (IEEE) LAN, such as IEEE 802.3, or IEEE 802.11, the address originates from the locally administered multicast pool as defined by the IEEE. Other LAN implementations, such as Home Phone Network Alliance (HPNA), and Bluetooth may utilize a specific address fitting within their particular addressing scheme. End devices specifically look for this address and ignore all other data without this address. By using a single, and locally known and administered multicast address for all LAN audio frames, the end device does not need to learn and store multiple addresses as is required with the current RTP specification. In addition, by using a single locally administered address, there is no conflict with other global multicast services.

Figure 2:
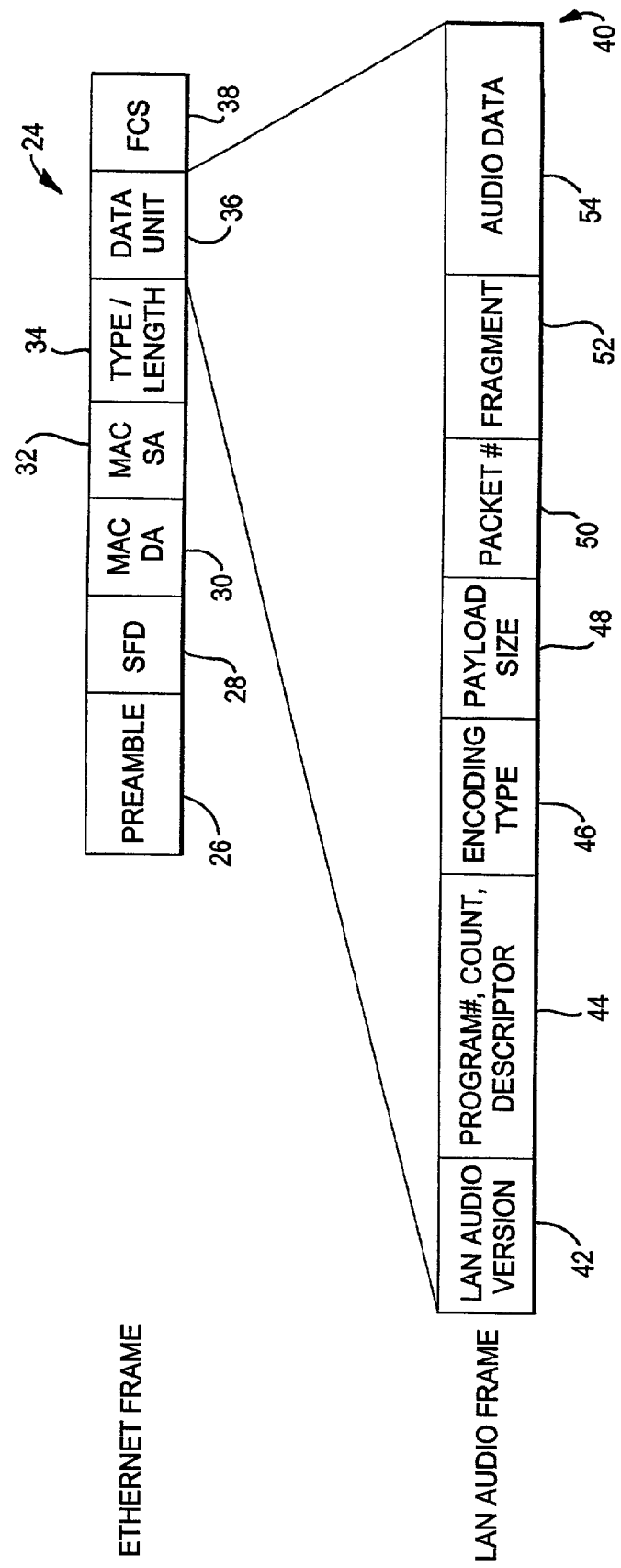
FIG. 2 is a diagram illustrating a Local Area Network (LAN) audio frame using a Medium Access Control Layer in accordance with a preferred embodiment of the present invention.
Figure 3:
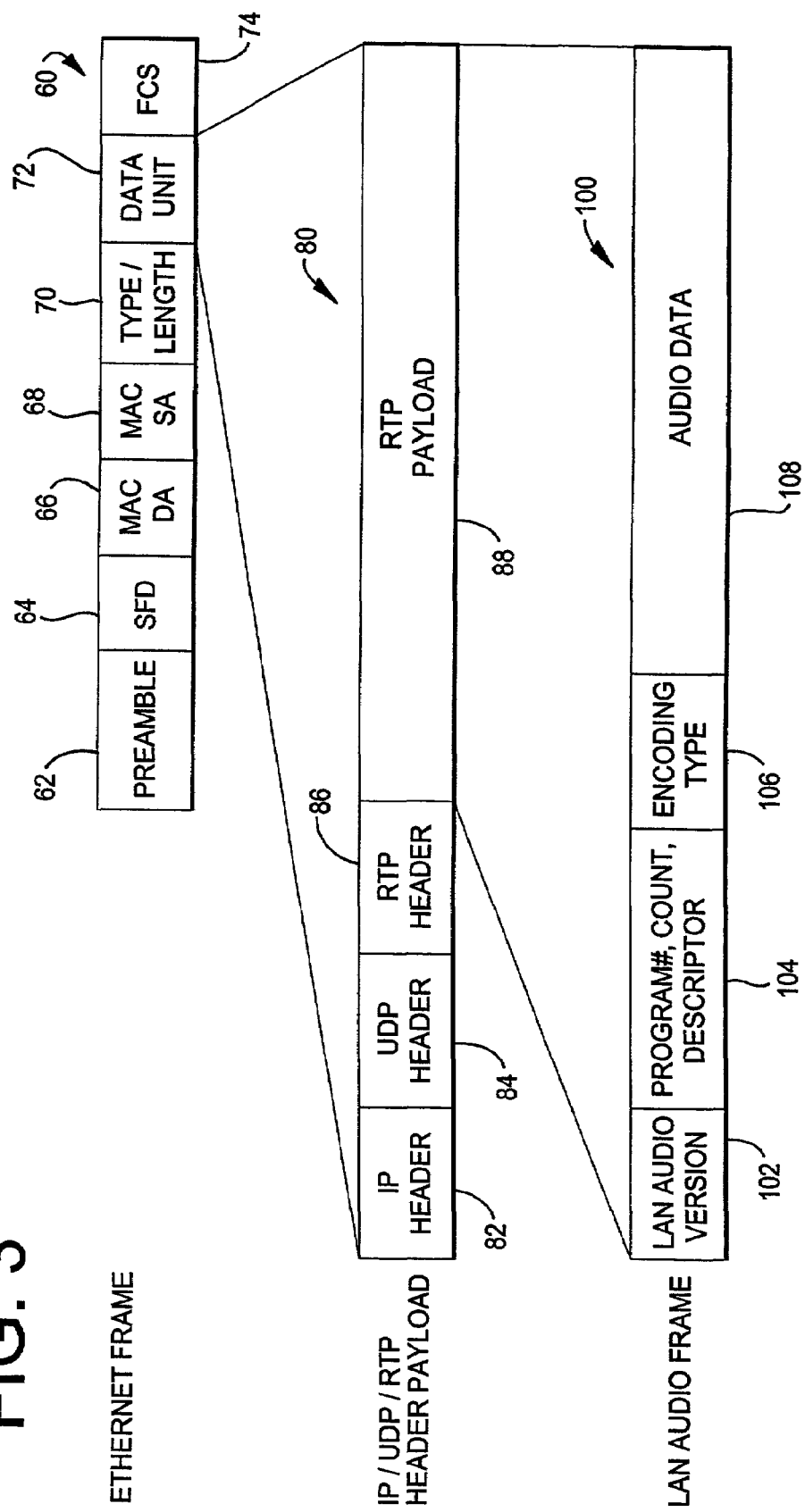
FIG. 3 is a diagram illustrating a LAN audio frame using the Internet Protocol/User Datagram Protocol/Realtime Transport Protocol (IP/IUDP/RTP) in accordance with a preferred embodiment of the present invention.

The final format of a LAN audio frame for two preferred embodiments, based on an Ethernet implementation, are shown in FIGS. 2 and 3. FIG. 2 is a diagram illustrating a LAN audio frame 40 using a MAC layer in accordance with a preferred embodiment of the present invention while FIG. 3 is a diagram illustrating a LAN audio frame 100 using an IP/UDP/RTP protocol in accordance with another preferred embodiment of the present invention.

In FIGS. 2 and 3 the ethernet frames 24, 60 of audio data are reformatted to a network audio frame such as the LAN audio frame 40, 100. The ethernet audio frame 24, 60 includes the following fields: a preamble 26, 62; Start of Frame Delimiter (SFD) 28, 64; MAC Destination Address (DA) 30, 66; MAC Source Address (SA) 32, 68; Type/length field 34, 70; Data Unit 36, 72 and Frame Check Sequence (FCS) 38, 74. In FIG. 2, the LAN audio header 40 follows the Type/Length field 34 while in FIG. 3 with the RTP implementation, it follows the RTP header 86.

The LAN audio frame 40 resulting from the preferred MAC layer embodiment includes the following fields: LAN audio version 42, program number, count, and/or descriptor 44, encoding type 46, payload size 48, packet number 50, fragmentation enabled or disabled 52, and audio data 54. Since the IP/UDP/RTP headers 80 already have provisions for payload size, fragmentation, and packet sequence, and since IP enables the use of other higher layer protocols to provide program mapping and descriptions, these items are not needed in the LAN audio header 100 for the embodiment illustrated in FIG. 3. The LAN audio frame 100 resulting from the preferred embodiment using the higher network layer protocols includes the following fields: LAN audio version 102, program number 104, encoding type 106 and audio data 108.

When the end device receives a LAN audio frame, it processes the LAN audio header 40, 100 to determine the program number 44, 104. If it matches the program number as set by the user, it then passes the data on to be processed, such as, for example, but not limited to, decoding, and digital to analog conversion. If the program number does not match, then the data is discarded. The end device can also use the program count to limit the channel selection available to the user to the value of the program count. If the end device has display capabilities, it can also process the program descriptor field and display the information associated with the program. Since the RTP embodiment illustrated in FIG. 3 may have both greater processing and display capabilities, this information may be obtained by alternate means such as RTCP and/or SLP.

Figure 4:
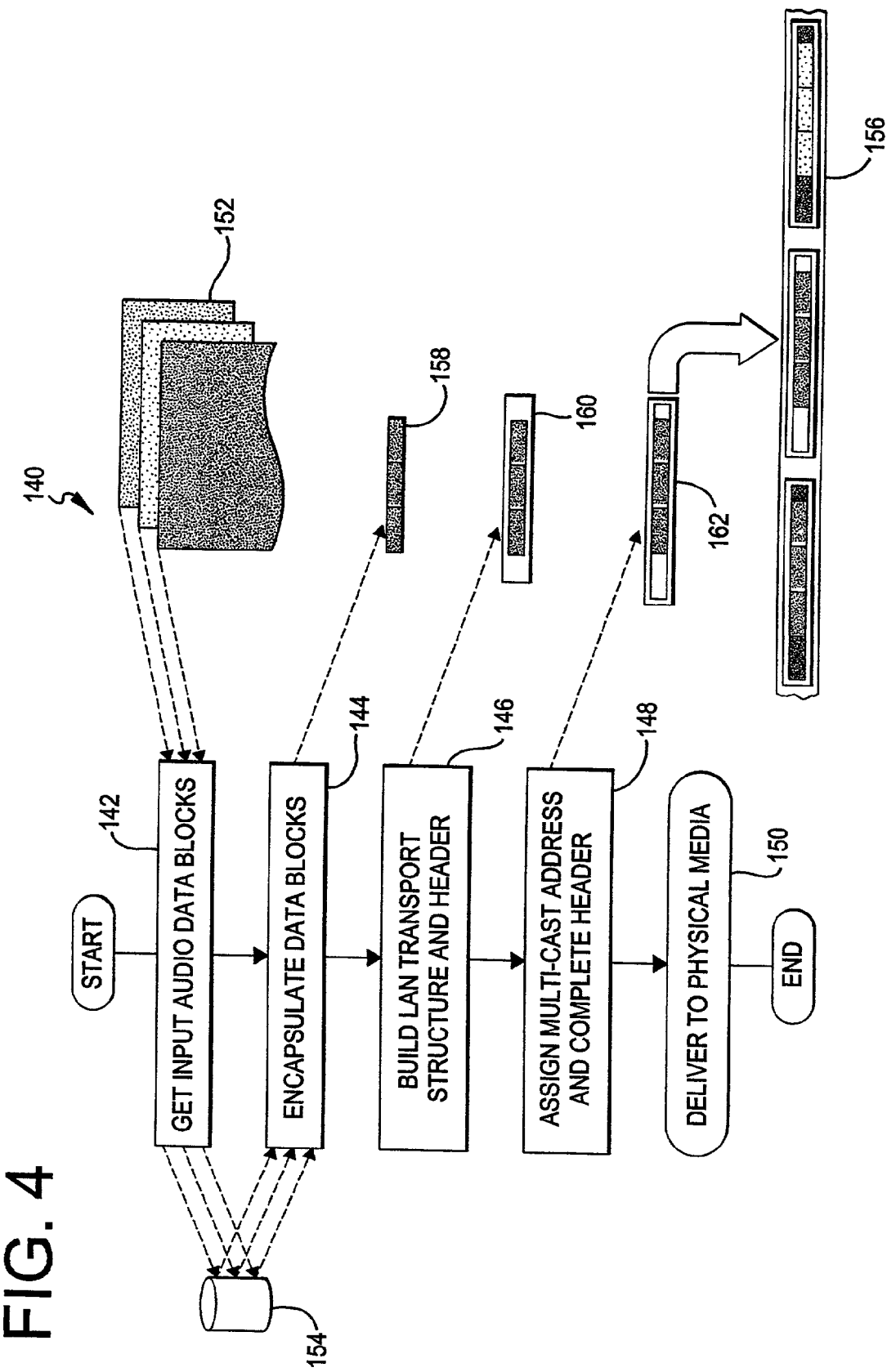
FIG. 4 is a flowchart diagram illustrating a method using the Medium Access Control layer implementation in accordance with a preferred embodiment of the present invention.

FIG. 4 is a flow chart diagram of a method 140 of a preferred embodiment using the MAC layer for distributing multi-program audio over a network in accordance with the present invention. The method 140 includes receiving input audio data blocks from a plurality of audio sources 152 per step 142. The input audio data blocks may be stored in a memory system 154 and then accessed to be encapsulated per step 144. In the alternative, the input audio data blocks may be encapsulated without being stored in the memory system 154. The method further includes building a network, and in a particular embodiment a LAN transport structure and header per step 146. Per step 148, the method includes assigning an address, such as, for example, a multi-cast address and a complete header to the LAN audio frame. The audio packet 162 is then delivered to the physical media per step 150. The audio packet 162 is then inserted into the data stream 156 to be delivered to an end device.

FIG. 5 is a flow chart diagram of a method 180 of another preferred embodiment using higher layer protocols for distributing multi-program audio over a network in accordance with the present invention. The method 180 includes receiving audio data blocks per step 182. In one embodiment, these input audio data blocks are stored in a memory system 200, and then accessed and encapsulated per step 184. In another embodiment, the audio data blocks are encapsulated per step 184, without being stored in the memory system 200. The method includes building an RTP packet and header in RTP stack per step 186 to create RTP stack 206. Further, the method includes building a UDP packet and header in a UDP stack per step 188 to result in a UDP stack 208. An IP packet and header in an IP stack are then built per step 190 and result in a IP stack 210. The method includes building a network transport structure and header such as a LAN transport structure and header per step 192. A multi-cast address and complete header is then assigned to the LAN transport structure 212 per step 194 to result in the packet 214. The packet 214 is then delivered to the physical media per step 196. Thus, the packet 214 is inserted into the data stream 202 and then accessed by an end device.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

It will be apparent to those of ordinary skill in the art that methods involved in the system and method for distributing multi-program audio over a network may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for distributing multi-program audio over a network comprising:

creating a plurality of network audio frames from a plurality of blocks of data from a plurality of audio programs, each audio program being encoded with a respective one of a plurality of audio formats;

placing each of the plurality of network audio frames within a respective one of a plurality of transport structures for transport across the network; and assigning a multicast address to the plurality of transport structures prior to delivering the plurality of transport structures to a physical media, wherein the plurality of transport structures are part of a single multicast stream, each network audio frame includes a respective network audio header followed by at least one of the plurality of blocks of data from any one of the plurality of audio programs, and each network audio header includes information that enables the carriage of the plurality of audio formats within the single multicast stream.

2. The method of claim 1, wherein the network includes one of a Local Area Network (LAN), Wide Area Network, an Intranet or Internet.

3. The method of claim 1, wherein the transport structure is an Open Systems Interconnection (OSI) model layer 2 frame.

4. The method of claim 1, wherein the transport structure is an application structure placed within an Open System Interconnection model (OSI) layer 4 structure, wherein the layer 4 structure is placed within an OSI layer 3 structure, and the layer 3 structure is placed within an OSI layer 2 structure.

5. The method of claim 1, wherein the network audio header includes information that is used by an end device to extract a single audio program from a multi-program LAN audio stream.

6. The method of claim 1, wherein the network audio header comprises one of at least a version number of a LAN audio protocol, size of a payload, number of programs in the multicast stream, program number, encoding type within the payload, packet sequence (per program), fragmentation (standard or proprietary), and program descriptor.

7. The method of claim 1, wherein the multicast address for the network audio distribution comprises a predetermined, locally administered multicast address that is consistent with the addressing format of the particular network.

8. The method of claim 7, wherein the multicast address is a multicast Medium Access Control (MAC) address if a Local Area Network (LAN) is used.

9. The method of claim 7, wherein the multicast address is locally administered.

10. The method of claim 7, wherein the multicast address is globally unique.

11. A computer readable medium having stored therein a set of instructions for causing a processing unit to execute the steps of the method of claim 1.

* * * * *